(12) United States Patent
Oddenino

(10) Patent No.: US 6,220,064 B1
(45) Date of Patent: Apr. 24, 2001

(54) FUEL FILLER ASSEMBLY FOR A VEHICLE

(75) Inventor: Manrico Oddenino, Buttigliera Alta (IT)

(73) Assignee: I.T.W. Fastex Italia S.p.A., Turin (IT)

( * ) Notice: Subject to any disclaimer, the term of this patent is extended or adjusted under 35 U.S.C. 154(b) by 0 days.

(21) Appl. No.: 09/427,714

(22) Filed: Oct. 27, 1999

(30) Foreign Application Priority Data

Oct. 28, 1998 (IT) ............................................ TO98A0914

(51) Int. Cl.$^7$ .................................................. B65D 55/14
(52) U.S. Cl. ................................ 70/169; 70/389; 70/165
(58) Field of Search ............................ 70/158, 165–171, 70/237, 258, 389

(56) References Cited

U.S. PATENT DOCUMENTS

| | | | |
|---|---|---|---|
| 2,308,892 | * | 1/1943 | Miller ...................................... 70/168 |
| 2,685,191 | * | 8/1954 | Ford ........................................ 70/169 |
| 2,696,100 | * | 12/1954 | Nehls ................................... 70/169 X |
| 2,816,433 | * | 12/1957 | Friend ...................................... 70/169 |
| 2,946,215 | * | 7/1960 | Eshbaugh et al. ....................... 70/169 |
| 3,136,148 | * | 6/1964 | Nehls ....................................... 70/169 |
| 3,708,032 | * | 1/1973 | Suzuki ................................. 70/389 X |
| 3,798,935 | * | 3/1974 | Blekking et al. ................... 70/389 X |
| 3,901,407 | * | 8/1975 | Mitchell et al. .................... 70/169 X |
| 4,280,347 | * | 7/1981 | Evans ...................................... 70/165 |
| 4,342,208 | * | 8/1982 | Evans ...................................... 70/165 |
| 4,351,446 | * | 9/1982 | Madden .............................. 70/168 X |
| 4,754,627 | * | 7/1988 | Butler, III .............................. 70/158 |
| 4,942,748 | * | 7/1990 | McGough .............................. 70/389 |
| 4,986,097 | * | 1/1991 | Derman ................................. 70/158 |
| 5,079,935 | * | 1/1992 | Zaucha .............................. 70/389 X |
| 5,317,889 | * | 6/1994 | Solovieff et al. .................. 70/389 X |
| 5,392,816 | * | 2/1995 | Hagenberg et al. ............... 70/171 X |
| 5,467,621 | * | 11/1995 | Gravino .................................. 70/171 |
| 5,904,057 | * | 5/1999 | Abney, III et al. .................... 70/167 |

\* cited by examiner

*Primary Examiner*—Suzanne Dino Barrett
(74) *Attorney, Agent, or Firm*—Lowe Hauptman Gilman & Berner, LLP

(57) ABSTRACT

A fuel filler assembly, in particular for a motor vehicle, having a filler, and a cap for closing a mouth of the filler and provided internally with a cylinder rotated by means of an operating key is disclosed. A reversible locking arrangement is provided for reversibly locking relative rotation of the cylinder with respect to the cap to selectively assume, when the cap is fitted closing the filler, a first operating position permitting relative rotation of the cylinder with respect to the cap and, hence, withdrawal of the operating key, and, when the cap is detached from the filler, a second operating position preventing relative rotation of the cylinder with respect to the cap and, hence, withdrawal of the operating key from the cylinder.

11 Claims, 2 Drawing Sheets

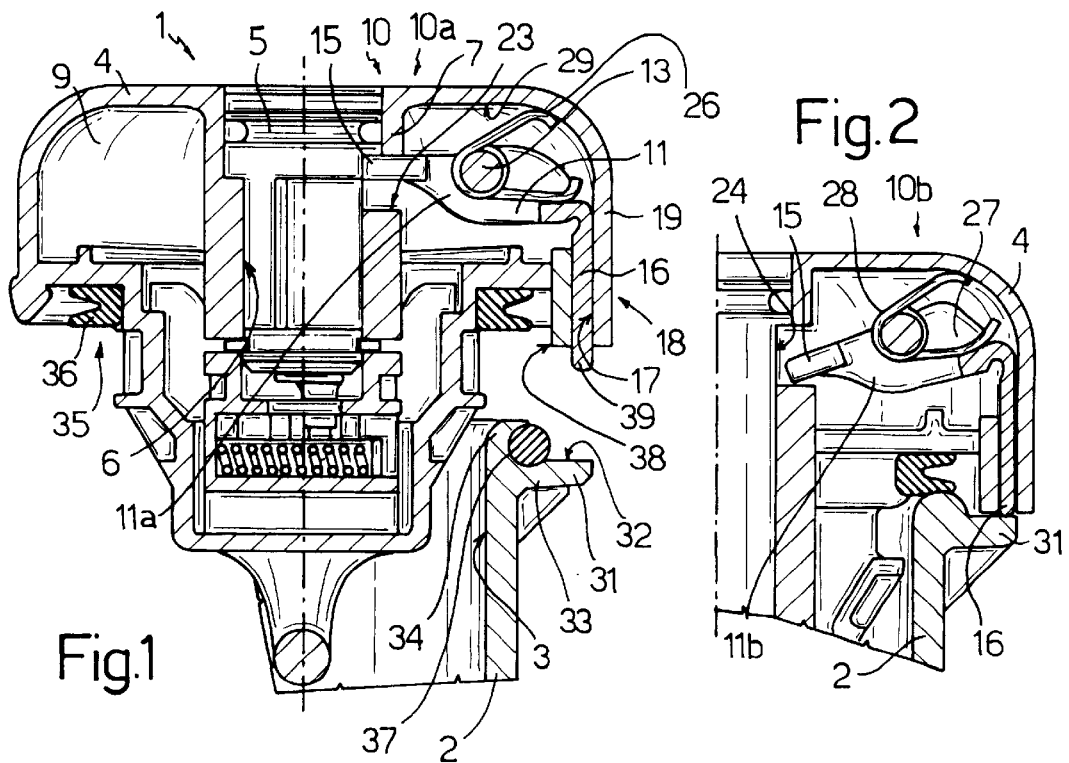

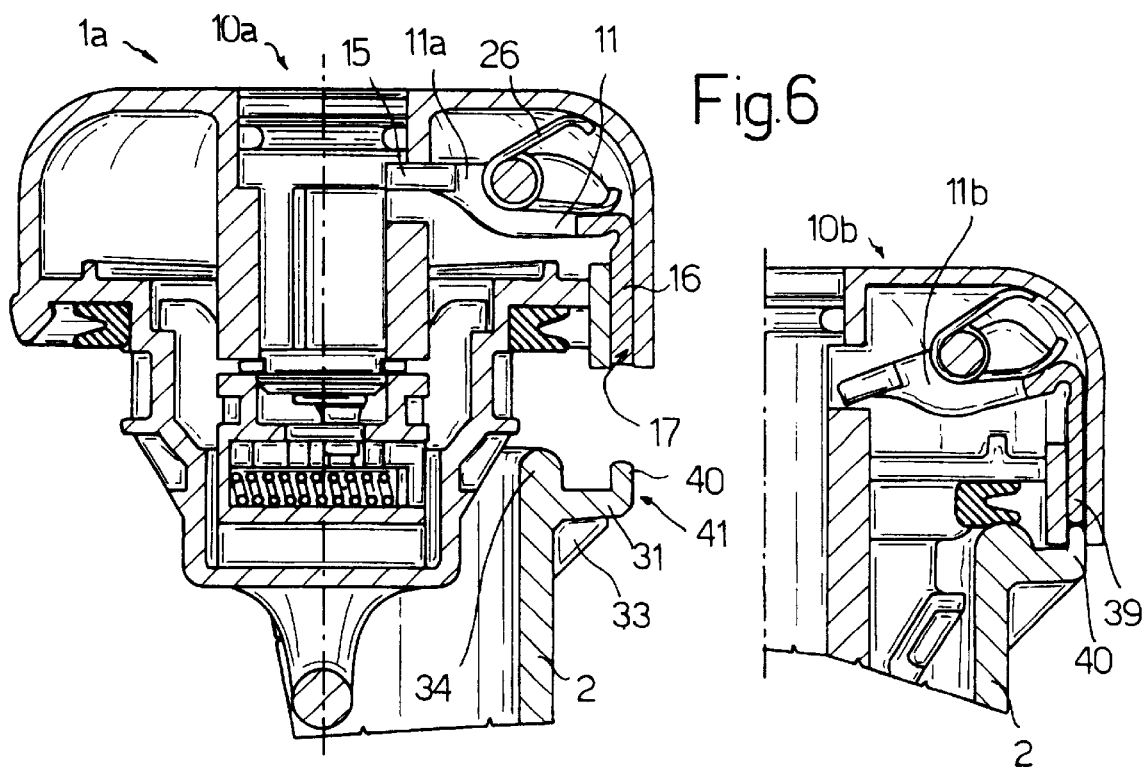
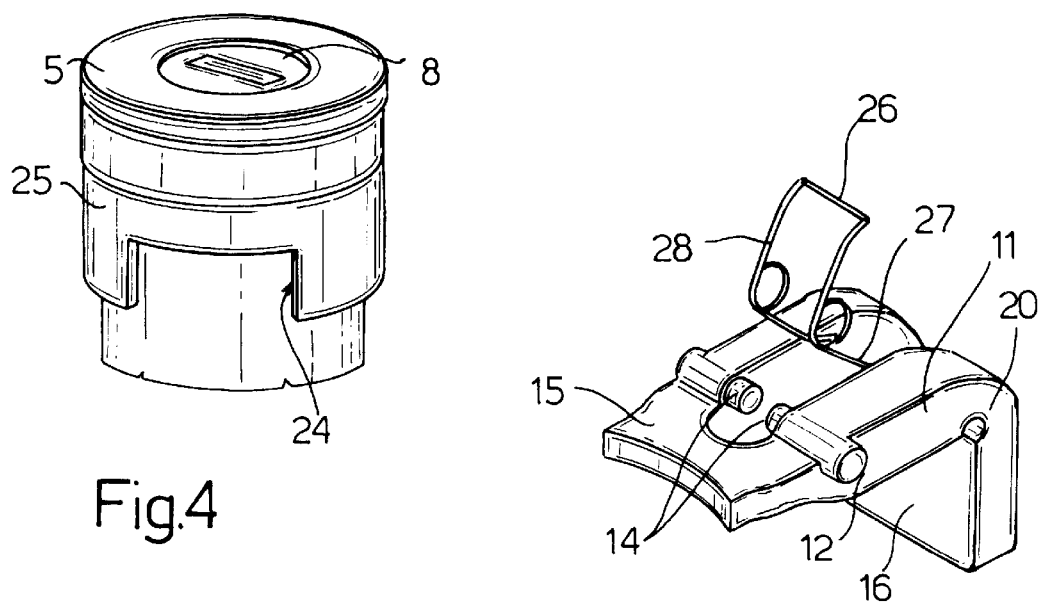

FUEL FILLER ASSEMBLY FOR A VEHICLE

The present invention relates to a fuel filler assembly, in particular for a motor vehicle.

BACKGROUND OF THE INVENTION

Vehicle fuel filler assemblies are known wherein the cap, once screwed onto the filler, is now locked by a key-operated locking device, e.g. using the ignition key of the vehicle itself, the key can be withdrawn from the lock cylinder (inside the cap) even when the cap is not fitted or is fitted improperly to the filler, so that danger exists when the vehicle is started up with a badly fitted or no cap, at all, resulting in possible leakage of fuel vapours or even actual fuel.

SUMMARY OF THE INVENTION

It is an object of the present invention to provide a fuel filler assembly to eliminate the aforementioned drawbacks, and which, in particular, is inexpensive and easy to produce and does not permit withdrawal of the key from the cap unless the cap is fitted properly to the filler.

According to the present invention, there is provided a fuel filler assembly, in particular for a motor vehicle, comprising a filler and a cap for closing a mouth of the filler. Said cap being provided internally with a cylinder rotated with an operating key. Reversible locking arrangement is provided for reversibly locking relative rotation of the cylinder with respect to said cap. A actuator means for selectively moving said reversible locking arrangement into a first operating position when the cap is detached from said filler, and a second operating position when the cap is to fitted close the filler. In the first operating position, said reversible locking arrangement secures the cylinder angularly to said cap to prevent relative rotation of the cylinder with respect to the cap and, hence, withdrawal of the operating key from the cylinder. In the second operating position, the reversible locking arrangement permits relative rotation of the cylinder with respect to the cap to permit withdrawal of the operating key from the cylinder.

The cylinder therefore only rotates inside the cap when set to the second operating position by the actuator which in turn only occurs when the cap is fitted correctly to close the filler. Conversely, when the cap is detached from the filler, the cylinder is secured angularly to the cap and prevented from being rotated into the position permitting withdrawal of the key. The filler assembly according to the invention is also expensive and easy to produce, and may be applied to various vehicles with no particularly complex alterations required.

BRIEF DESCRIPTION OF THE DRAWINGS

A preferred, non-limiting embodiment of the invention will be described by way of example with reference to the accompanying drawings, in which:

FIG. 1 is a schematic longitudinal section of a filler assembly in accordance with the present invention, in the open position (with the cap detached from the filler);

FIG. 2 shows a detail of the FIG. 1 filler assembly in the closed position (with the cap fitted to the filler);

FIGS. 3, 4 and 5 show respective isolated details of the FIG. 1 filler assembly;

FIGS. 6 and 7 show the same views as in FIGS. 1 and 2 of a possible variation of the filler assembly according to the invention.

DETAILED DESCRIPTION OF THE INVENTION

With reference to FIG. 5, number 1 a motor vehicle filler assembly comprises a tubular filler 2 connected, in a known manner not shown for the sake of simplicity, to a fuel tank and defined at one end by a circular mouth 3 for receiving a cap 4 for closing filler 2.

Cap 4 is fitted to filler 2 in a known manner and comprises a known key-operated locking device (not described in detail for the sake of simplicity). More specifically, cap 4 is provided internally with a cylinder 5 housed for rotation inside a respective cylindrical seat 6 defined by a lateral wall 7; cylinder 5 is rotated inside cylindrical seat 6 by means of an operating key inserted inside a slot 8 in cylinder 5; and cap 4 also has an annular chamber 9 extending about and radially outwards of cylindrical seat 6.

According to the invention, filler assembly 1 comprises a reversible locking means 10 for reversibly locking relative rotation of cylinder 5 with respect to cap 4. More specifically, reversible locking means 10 comprises a locking member 11 fitted movably inside annular chamber 9 of cap 4 in the example shown, (see FIG. 5) locking member 11 comprises a rocker-arm body 12 made, for example, of substantially rigid polymer material and hinged to cap 4 at at least one fulcrum 13 by, for example, two pins 14 (FIG. 5) inserted inside respective supports (not shown for the sake of simplicity) on cap 4; opposite arms of rocker-arm body 12, located on opposite sides of fulcrum 13, respectively define a lock tooth 15 and a control portion 16, which is housed in sliding manner inside a guide 17 formed at a peripheral edge 18 of cap 4 and more specifically inside an eccentric projecting portion 19 of cap 4; and control portion 16 of locking member 11 is connected in one piece to rocker-arm body 12 by a narrow section 20, which acts as a virtual hinge permitting predetermined elastic deformation of control portion 16 with respect to rocker-arm body 12.

Lock tooth 15 of locking member 11 extends radially through a through opening 23 formed in lateral wall 7 defining cylindrical seat 6 of cylinder 5 and separating cylindrical seat 6 from annular chamber 9.

Cylinder 5 comprises a seat 24 (see FIG. 2 and 4 defined, in the example shown, by a slot of predetermined size formed in a circumferential collar 25, of predetermined height, of cylinder 5. As explained below, seat 24 provides for receiving lock tooth 15 of locking member 11.

Locking member 11 also comprises elastic means 26 for exerting a predetermined action on and for maintaining locking member 11 in a predetermined position. More specifically, elastic means 26 comprises a fork-shaped spring made of bent wire, a first arm 27 of which is secured integrally to locking member 11, and a second arm 28 which rests on an inner surface 29 of cap 4, e.g. a wall of annular chamber 9.

Filler 2 comprises an actuating member 31 defined, in the non-limiting embodiment shown in FIGS. 1 and 2, by a stop surface 32 of an annular collar 33 located radially outwards, and a predetermined distance from an end edge 34, of mouth 3.

Filler assembly 1 also comprises, in substantially known manner, face and/or radial sealing means 35 between cap 4 and filler 2. As shown purely by way of a non-limiting example in FIG. 1, sealing means 35 may comprise a face sealing ring 36, e.g. housed in a circumferential seat on cap 4 and which rests on end edge 34 of mouth 3, and/or a radial sealing ring 37, e.g. housed in a respective circumferential seat formed on a lateral outer surface of filler 2, close to mouth 3, and which cooperates with an inner edge 38 of cap 4.

As shown in FIG. 1, when cap 4 is detached from filler 2, locking means 10 is in an operating position 10a wherein locking member 11 is maintained by spring 26 in a stop position 11a with lock tooth 15 engaging seat 24 of cylinder 5; and control portion 16 of locking member 11 is of such an extension that a free end 39 of the control portion projects a given amount from guide 17.

In the above condition, wherein lock tooth 15 of locking member 11 engages seat 24 so that cylinder 5 and cap 4 are rotationally fixed with each other, locking means 10 prevent relative rotation of cylinder 5 with respect to cap 4, and in particular rotation of cylinder 5 into the position enabling withdrawal of the operating key, which therefore cannot be extracted.

Conversely, when cap 4 is fitted to filler 2 as shown in FIG. 2, actuating member 31 of filler 2 pushes control portion 16 of locking member 11 projecting from guide 17 so as to rotate locking member 11 about fulcrum 13 and, in opposition to the elastic reaction of spring 26, into a rest position 11b wherein lock tooth 15 is withdrawn from seat 24 of cylinder 5 and moved into a position beneath circumferential collar 25 of cylinder 5. When cap 4 is properly fitted to closing mouth 3 of filler 2, in a flush manner reversible locking means 10 therefore assume an operating position 10b permitting relative rotation of cylinder 5 with respect to cap 4, and in particular rotation of cylinder 5 into the position enabling withdrawal of the operating key.

FIGS. 6 and 7, in which any details similar to or identical with those already described are indicated using the same reference numbers, show a possible variation 1a of the filler assembly according to the invention. Filler assembly 1a is identical to filler assembly 1 described above, except for control portion 16 of locking member 11, which in this case is again housed in sliding manner inside guide 17 of cap 4, but is of such an extension as to be housed entirely inside guide 17 even when locking member 11 is in stop position 11a (FIG. 6). Also, actuating member 31 of filler 2 again comprises an annular collar 33 located radially outwards, and a predetermined distance from an end edge 34, of mouth 3, but also comprises a projection 40 projecting from an outer peripheral edge 41 of annular collar 33 and so sized as to be insertable inside guide 17 of cap 4 to push the free end 39 of control portion 16 of locking member 11 when cap 4 is fitted closing mouth 3 of filler 2 (FIG. 7). This prevents locking member 11 from being moved manually—e.g. by exerting finger pressure on control portion 16 projecting from guide 17—from stop position 11a to rest position 11b, even when cap 4 is not actually fitted to filler 2.

Clearly, further changes may be made to the filler assembly as described above without, however, departing from the scope of the accompanying claims.

What is claimed is:

1. A fuel filler assembly for a vehicle, comprising a filler and a cap for closing a mouth of said filler; said cap including a cylinder being rotatable with an operating key; a reversible locking arrangement operatively positioned in relation to said cylinder for reversibly locking relative rotation of said cylinder with respect to said cap; and an actuator positioned for selectively moving said reversible locking arrangement into a first operating position when said cap is detached from said filler, and a second operating position when said cap is fitted to close the filler; wherein, in said first operating position, said reversible locking arrangement rotationally fixes said cylinder to said cap to prevent relative rotation of said cylinder with respect to said cap and thereby prevents withdrawal of the operating key from the cylinder; and, in said second operating position, said reversible locking arrangement is moved to permit relative rotation of said cylinder with respect to said cap to permit withdrawal of said operating key from the cylinder.

2. A filler assembly as claimed in claim 1, wherein said reversible locking arrangement comprises at least one locking member movably fitted inside said cap and having at least one lock tooth for engaging a respective seat formed on said cylinder to prevent relative rotation of the cylinder with respect to the cap; said locking member also having an elastic member positioned for normally biasing said locking member into and maintaining said locking member in a stop position wherein said lock tooth engages the respective seat on the cylinder when said cap is detached from the filler, whereby said key cannot rotate the cylinder and said filler having at least one actuating member which cooperates with said locking member of the cap to move the locking member into a rest position wherein said lock tooth does not engage the respective seat on the cylinder when said cap is properly fitted closing the fillers, whereby said key can rotate the cylinder.

3. A filler assembly as claimed in claim 2, wherein said locking member comprises at least one control portion; said actuating member of said filler pushing said control portion of the locking member to move said locking member and release said lock tooth from said respective seat on the cylinder.

4. A filler assembly as claimed in claim 3, wherein said locking member comprises a rocker-arm body hinged to said cap at at least one fulcrum of the rocker-arm body; said lock tooth and said control portion of said locking member being located on respective opposite arms of said rocker-arm body on opposite sides of said fulcrum.

5. A filler assembly as claimed in claim 4, wherein said control portion of the locking member is housed in a sliding manner inside a guide formed at a peripheral edge of said cap; said control portion of the locking member being connected in one piece to said rocker-arm body by a narrow section acting as a virtual hinge to permit predetermined elastic deformation of said control portion.

6. A filler assembly as claimed in claim 5, wherein said control portion is of such an extension that a free end of the control portion projects by a predetermined amount from said guide when said locking member is in said stop position; said actuating member of the filler comprising a stop surface located on a peripheral edge of said mouth that pushes said free end of the control portion when the cap is property fitted closing the filler.

7. A filler assembly as claimed in claim 5, wherein said control portion is of such an extension as to be housed entirely inside said guide when said locking member is in said stop position; said actuating member comprising at least one projection projecting from a peripheral edge of said mouth and which is inserted inside said guide of the cap to push a free end of said control portion when the cap is fitted closing the filler.

8. A filler assembly as claimed in claim 2, wherein said elastic member comprises at least one fork-shaped spring made of bent wire, a first arm of which is secured integrally to said locking member, and a second arm of which rests on an inner surface of said cap.

9. A filler assembly as claimed in claim 2, wherein said seat on the cylinder is defined by a slot formed in a circumferential collar of said cylinder.

10. A filler assembly as claimed in claim 1, further comprising face sealing means between said cap and said filler.

11. A fuel filler assembly, in particular for a motor vehicle, comprising a filler and a cap for closing a mouth of said filler; said cap being provided internally with a cylinder rotated by means of an operating key; further comprising reversible locking means for reversibly locking relative rotation of said cylinder with respect to said cap; and actuator means for selectively moving said reversible locking arrangement into a first operating position when said cap is detached from said filler, and a second operating position when said cap is fitted to close the filler in said first operating position, said reversible locking means rotationally fixes said cylinder to said cap to prevent relative rotation of said cylinder with respect to said cap and, hence, withdrawal of the operating key from the cylinder; and, in said second operating position, said reversible locking means permits relative rotation of said cylinder with respect to said cap to permit withdrawal of said operating key from the cylinder.

\* \* \* \* \*